July 14, 1925. 1,545,678

J. W. MILLER

FLUID TRANSMISSION

Filed Aug. 16, 1923 5 Sheets-Sheet 1

WITNESSES:—

Inventor
J. W. Miller,
By
Attorney

July 14, 1925.　　　　　　　　　　　　　　　　　　1,545,678
J. W. MILLER
FLUID TRANSMISSION
Filed Aug. 16, 1923　　　　5 Sheets-Sheet 2

Inventor
J. W. Miller
By
Attorney

WITNESSES:-

July 14, 1925. 1,545,678

J. W. MILLER

FLUID TRANSMISSION

Filed Aug. 16, 1923    5 Sheets-Sheet 3

Witnesses:

Inventor
J. W. Miller

July 14, 1925.
J. W. MILLER
FLUID TRANSMISSION
Filed Aug. 16, 1923
1,545,678
5 Sheets-Sheet 4
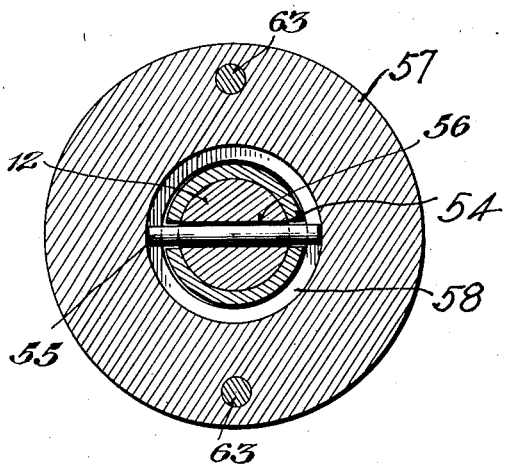
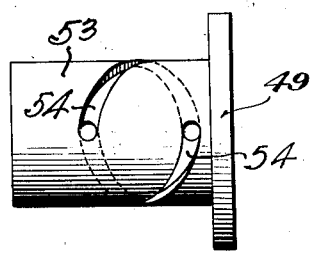
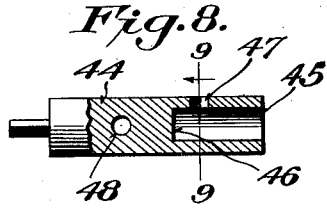
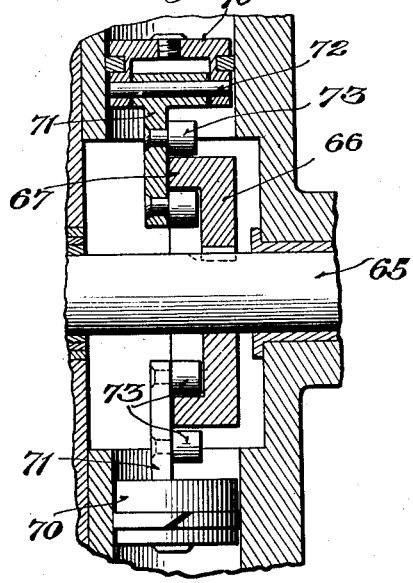
Inventor
J. W. Miller,
Witnesses:-

July 14, 1925. 1,545,678
J. W. MILLER
FLUID TRANSMISSION
Filed Aug. 16, 1923 5 Sheets-Sheet 5

Inventor
J. W. Miller

Patented July 14, 1925.

1,545,678

UNITED STATES PATENT OFFICE.

J. W. MILLER, OF SPRINGFIELD, MISSOURI.

FLUID TRANSMISSION.

Application filed August 16, 1923. Serial No. 657,784.

*To all whom it may concern:*

Be it known that I, J. W. MILLER, a citizen of the United States, residing at Springfield, in the county of Greene and State of Missouri, have invented certain new and useful Improvements in Fluid Transmission, of which the following is a specification.

This invention relates to hydraulic transmissions of the type adapted for use on motor vehicles, and to that end contemplates a reliable construction susceptible of embodiment in compact form and having readily manipulated control means for obtaining forward and reverse drive of the vehicle.

Another object of the invention is to provide a construction including a combination of fluid pump and fluid motor in a novel and practical manner thereby providing a construction which is economical to manufacture and easy to assemble.

A further object of the invention is to provide a construction which is simple and reliable in operation and so constructed as to avoid the generation of excess heat which is one of the objections incident to many devices of this general type.

With these and other objects in view, which will more readily appear as the nature of the invention is better understood, the same consists in the novel construction, combination and arrangement of parts hereinafter more fully described, illustrated and claimed.

In the drawings:

Figure 6 is a detail cross-sectional view taken on the line 6—6 of Figure 1.

Figure 7 is an elevation of the control eccentric.

Figure 8 is a longitudinal sectional view through one of the controlling valves.

Figure 9 is a cross-sectional view of the valve taken on the line 9—9 of Figure 8.

Figure 10 is a detail horizontal sectional view taken on the line 10—10 of Figure 3 showing the relation of one of the control valves to the adjacent pump cylinder and oil chamber.

Figure 12 is a detail sectional view taken on the line 12—12 of Figure 11, and

Like reference numerals indicate like parts throughout the several figures of the drawings.

Figure 1:
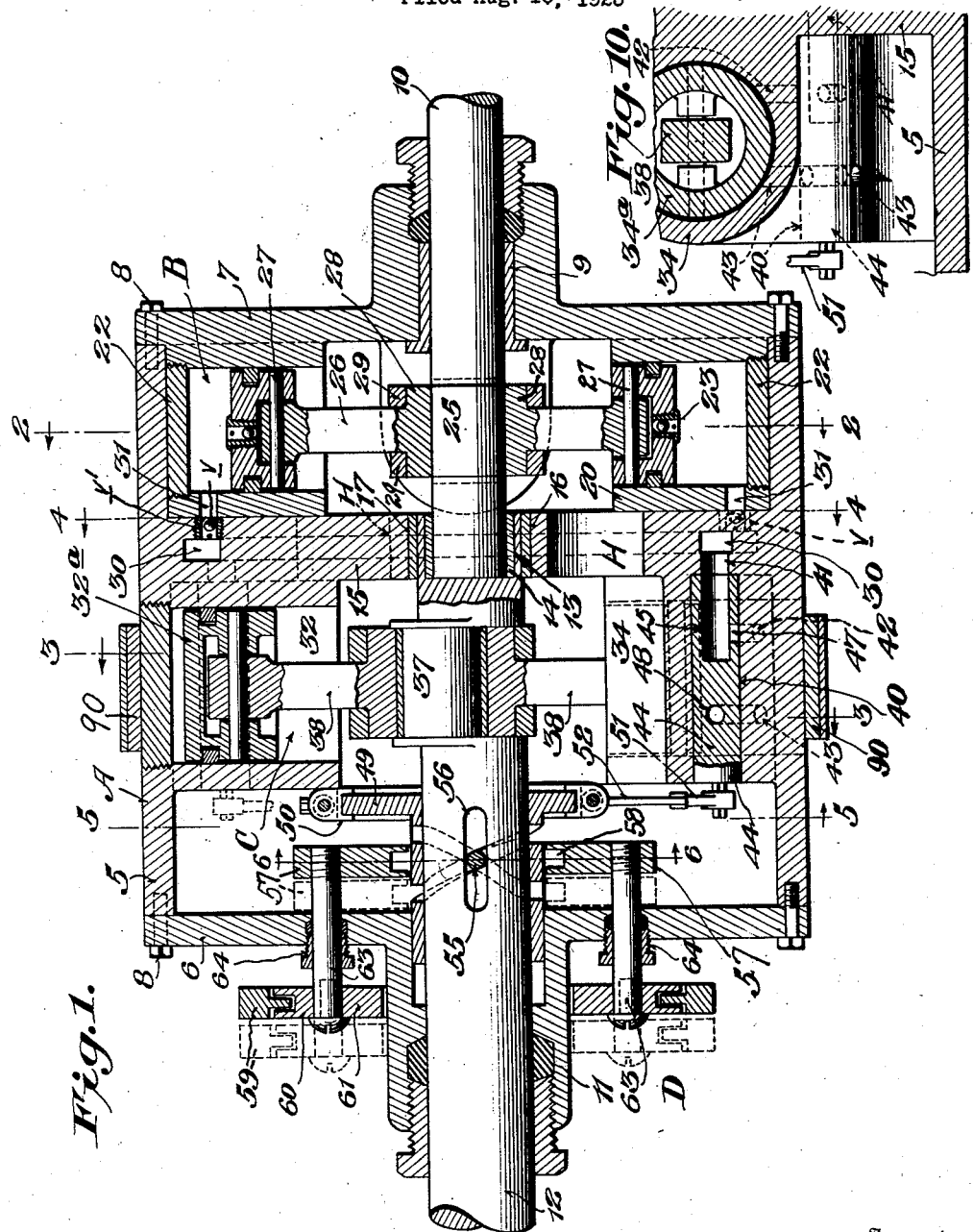
Figure 1 is a longitudinal sectional view through the hydraulic transmission mechanism constructed in accordance with my invention, the line of section being irregular for the purpose of better setting up certain of the details.
Figure 2:
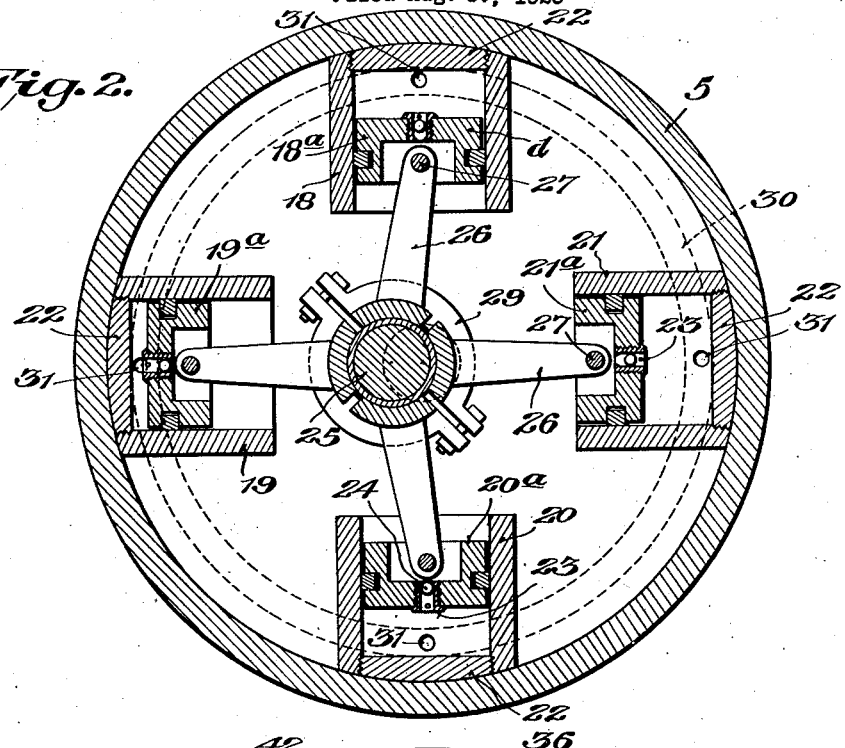
Figure 2 is a vertical sectional view taken on the line 2—2 of Figure 1.

In carrying out my invention I provide a housing or casing A which contains a pump B, and a fluid motor or driver C which is controlled by a manually manipulated mechanism D. These instrumentalities are assembled in the form of a compact unit that may be readily installed at the proper location between the engine and the propeller shaft so that the power from the engine is directly imposed on the pump whereby the latter will force the fluid medium to the motor under pressure to enable the engine to gradually pick up and carry the load with ease and smoothness until the inertia of starting has been overcome, at which time the pump and driver may be locked together with the casing by the closing of the proper valves, to thus cause the whole unit to rotate with the propeller shaft.

The casing A includes a cylindrical body 5 which is closed at its ends by end walls 6 and 7, the latter being secured to the cylinder by screws 8. The end wall 7 is provided with a concentric bearing 9 in which is journaled one end of the driving shaft 10 from the engine. The end wall 6 is provided with a concentric hub or bearing 11 for receiving one end of the propeller or driven shaft 12.

The shafts 10 and 12 are disposed in alignment and their meeting ends are disposed in overlapping or telescopic relation, the end of the driven shaft 12 being counterbored as at 13 to receive a hardened bearing sleeve 14 in which the adjacent end of the driving shaft 10 is journaled. The body 5 intermediate its ends and between the pump B and the motor C is formed with a web 15 which is provided with a central bearing opening 16 which may be fitted with a sleeve 17 to provide an adequate bearing for the shaft 12. This web 15 is formed with a plurality of transverse openings H which permit of the return of oil or other fluid contained within the casing A from the exhaust ports of the motor C to the pump B.

The primary pump B includes a plurality of radially extending pump cylinders 18, 19, 20 and 21 which are carried by the end wall 7 for convenience in assembling and if they are cast integral with the wall 7 as shown, the heads thereof may be formed by the screw caps 22 which are fitted in place after the boring or machining operation. Slidably mounted in the primary pump cylinders 18, 19, 20 and 21 are pistons 18a, 19a, 20a, and 21a, each piston being formed with a valved passage 23 which affords communication between the cylinder proper and the oil chamber of the casing, the valve 24 thereof being unseated during the inward movement of the piston and seated during the outward movement thereof. The said pump pistons are connected to a crank 25 formed on the driving shaft 10 by links 26, the outer end of each link being pivotally connected as at 27 to the corresponding piston and the inner end of each link being provided with oppositely extending bearing flanges 28—28. These bearing flanges are fitted to the crank 25 and are spaced apart so as to permit of a slight relative movement. In order to retain the bearing flanges in cooperative relation relative to the crank, I have provided the two part clamping rings 29—29 which embrace the respective bearing flanges 28 and are disposed on opposite sides of the connecting links.

Formed in the web 15 is an annular oil passage or chamber 30 which communicates with the several pump cylinders by means of the passages 31 which are conjointly formed in the web and cylinders. These passages may be provided with the check valves $v$ located in the bushing cages $v'$ said valves being so aranged as to open during the outward movement of the pistons and to close during the inward movement thereof.

The function of the check valves in their cages is to prevent back pressure or the return of fluid from the intermediate oil chamber to the cylinders of the pumping unit, and in accomplishing that function it is apparent that the check valves may be of any approved type and arranged in any desirable position provided they act to freely permit the fluid to be pumped from the pumping unit into the oil chamber and to check or prevent back flow or back pressure of the fluid toward and into the cylinders of the pumping unit.

The motor or driver C includes a plurality of radially extending cylinders 32, 33, 34 and 35 which are preferably cast integral with the body of the casing, the outer end of each cylinder being closed by a threaded end cap 36. Slidably mounted in these cylinders 32, 33, 34 and 35 are driving pistons 32a, 33a, 34a and 35a which actuate the driven shaft 12 through the medium of a crank 37 formed on the said driven shaft 12 and the radially extending links 38 which are respectively connected at their outer ends to the pistons and at their inner ends to the crank by collars 39.

Formed in the casing 5 adjacent the motor cylinders are longitudinally extending valve seats 40 each communicating with the annular fluid passage or chamber 30 formed in the web 15 by means of a passage 41 and also communicating with its corresponding cylinder through an inlet passage 42 which establishes communication between the cylinder and the interior or oil chamber of the casing. Also exhaust passages 43 extend across the respective valve seats 40 to establish communication between each cylinder and the oil chamber when the valve 44 is turned to the proper position, as will presently appear.

In order to control the flow of the fluid to the motor cylinders, I have provided in each seat 40 a rotary valve 44 having an inwardly extending longitudinal bore 45 and communicating with the correspnding passage 41. The said counterbore or passage 45 of the valve terminates as at 46 and a radially extending port 47 is adapted to establish communication between the corresponding inlet passage 42 and the passage 45 of the valve. When the valve is turned so as to bring about this communication, it will be noted that oil will be pumped from the pump cylinders into the annular passage 30 and thence into the motor cylinders. Each valve 44 is furthermore provided with an exhaust port 48 which extends transversely thereof and is disposed at an angle of 90° to the port 47. The port 48 is adapted to register with a corresponding exhaust passage 43 and thereby permit oil contained in a motor cylinder to be exhausted or discharged into the oil chamber of the casing.

In order to control the speed of the driven shaft 12, or control its direction of rotation, I have provided a manually operable control mechanism which I have heretofore designated as a whole by the reference letter D. This control mechanism includes an eccentric 49 which is mounted on the driven shaft 12 for limited oscillatory movement. Mounted on the periphery of the eccentric 49 and having slidable engagement therewith is a flanged annulus 50 which preferably comprises opposed semicircular sections bolted together. Fixed to the outer end of each controlling valve 44 is a rock arm 51 and links 52 are each connected at one end to a corresponding rock arm 51 and at the other end to the annulus 50.

In order to manually control the eccentric 49 so as to either completely close the valves 44 or partially open the same, or to oscillate them and reverse the inlet ports 42 of the cylinders 32 and 33, and the outlet ports 43 of the cylinders 34 and 35, I have provided the eccentric with an outwardly extending sleeve 53 which is fixed to the eccentric and has radial movement relative to the driven shaft 12. This sleeve is formed with two helical grooves or slots 54—54. A pin 55 extends through the helical slots 54 and through an elongated and transversely disposed opening 56 formed in the driven shaft 12. The width of the slot 56 is slightly greater than the diameter of the pin 12 so as to retain the latter against oscillatory movements relative to said shaft but to permit of bodily movements longitudinally thereof. When the pin 55 is thus moved longitudinally of the shaft 12, the eccentric 49 will be oscillated through the medium of the helical grooves 54, the amount of oscillation of the eccentric being determined by the amount of movement imparted to the pin 55, the maximum movement of the eccentric being 180°.

When the pin 55 is at the extreme left position of the slot 56 as viewed in Fig. 1, the inlet passage 42 to the completely exhausted cylinder will be closed and the inlet passage to the opposite full cylinder will be open, the inlet passages to the two other cylinders being in intermediate position thereby locking the cylinders and pistons. Therefore, the entire mechanism will revolve with the driving shaft 10 and the driven shaft 12 will be thereby rotated at the same rate of speed. As the pin is moved towards an intermediate position, the inlet ports 42 will be gradually opened and consequently oil will be pumped into the motor cylinders thus permitting relative slippage between the shaft 10 and shaft 12 and correspondingly reducing speed of the driven shaft 12. When the pin 55 reaches an intermediate position these inlet valves of the motor cylinders are entirely open and consequently the valves are in neutral position, thus causing the driven shaft 12 to remain idle although the driving shaft 10 continues to rotate. When the pin reaches its intermediate position the sleeve 53 and the eccentric 49 have been oscillated through an arc of 90°. As the pin 55 is moved from its intermediate position to the extreme right-hand position of movement as viewed in Figure 1, the sleeve and eccentric will be oscillated another 90°. It will be observed that the pin 55 has three main positions of adjustment, viz: high, neutral and reverse.

In order to shift the pin 55 into these various positions, I have provided a disk 57 which surrounds the sleeve 53 and is formed with an inner circumferential groove 58 for receiving the ends of the pin 55. The disk 57 is disposed between the end wall 6 of the casing and eccentric 49 and is adapted to be actuated by a pedal collar 59 having a tongue and groove connection 60 with a disk 61 slidably mounted on the outwardly extending hub 11 formed on the end wall 6. Guide pins 63—63 are fixed to the disk 61 and passed through openings 64 formed in the end wall 6 and for fixed engagement with the disk 57. Thus by moving the collar 59 by means of a pedal or hand lever (not shown), the guide pins 63 will move the disk 57 inwardly toward the eccentric 49 and thereby cause the pin 55 to be bodily moved in the same direction, this movement of the pin oscillating the eccentric 49 in the manner above described for controlling the valves 44 of the motor.

In operation, assume that the manual control D is in its normal position, viz., at the extreme left-hand position as viewed in Fig. 1. The controlling valves 44 are then arranged so that oil will not be pumped through the motor cylinders. As a result, the pump will not function and the pistons cannot reciprocate. Consequently the casing 5 will revolve with the driving shaft 10, and inasmuch as the motor pistons will not function, the driven shaft 12 will be rotated at the same rate of speed as the driving shaft.

When, however, the control D is moved inwardly towards its intermediate or neutral position, the eccentric 49 will be oscillated 90°, the valves 44 will be correspondingly turned and oil will be fed into and exhausted from all of the several cylinders in succession.

Figure 3:
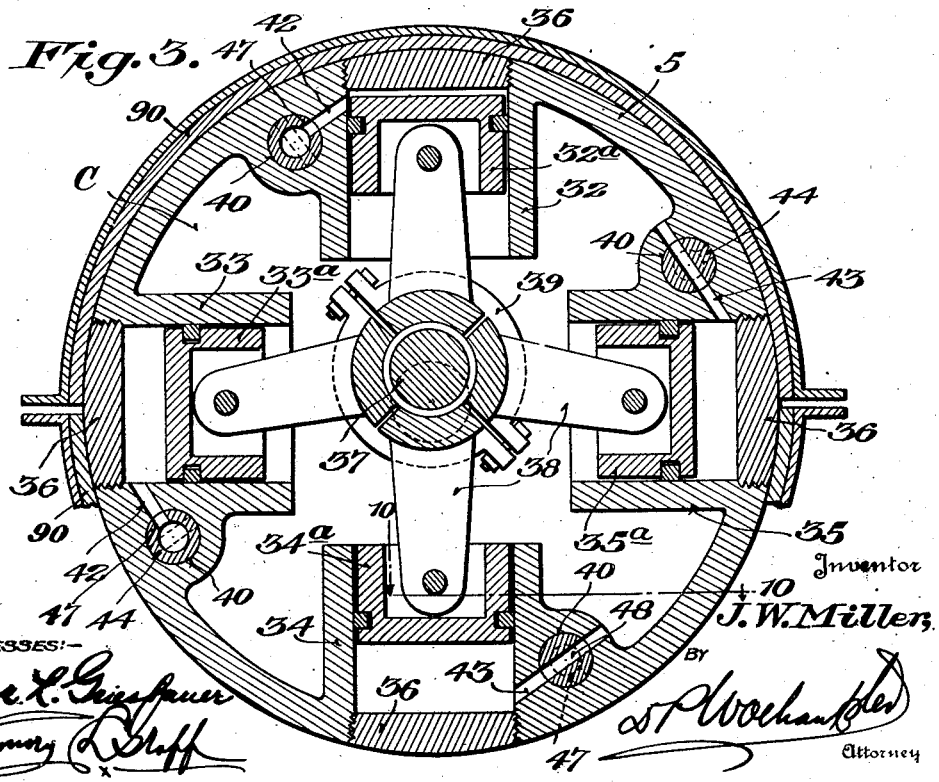
Figure 3 is a vertical sectional view taken on the line 3—3 of Figure 1.
Figure 4:
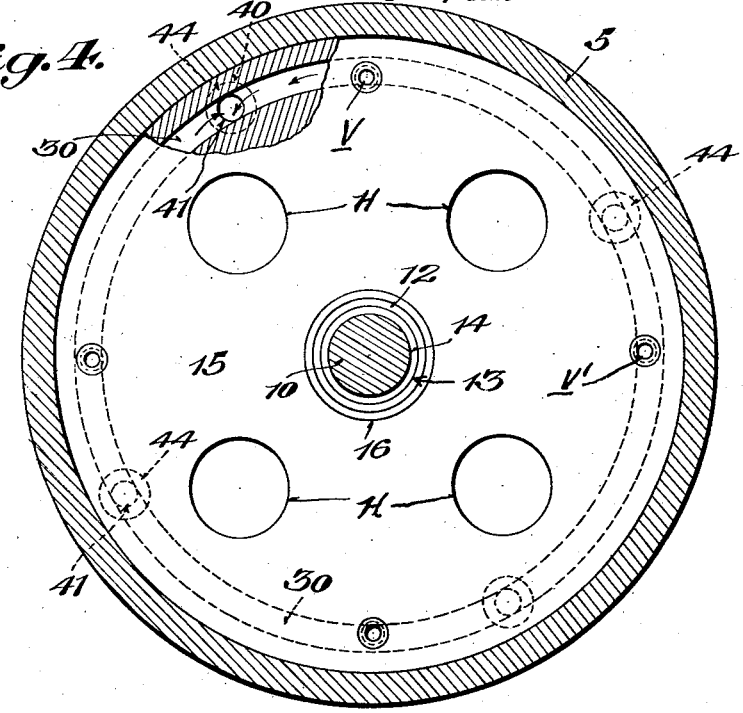
Figure 4 is a vertical sectional view taken on the line 4—4 of Figure 1.
Figure 5:
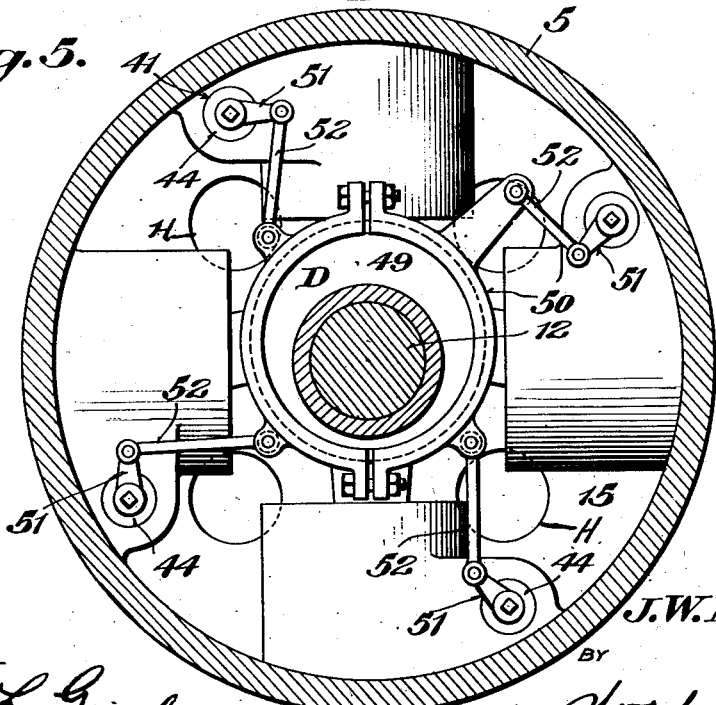
Figure 5 is a vertical sectional view taken on the line 5—5 of Figure 1.

With the arrangement above described, a fluid under pressure will be admitted to all four cylinders in succession, either forwardly and backwardly, and exhausted therefrom in succession, the fluid being admitted to one of two diametrically opposite cylinders, for example 32 in Figure 3, while being exhausted from the other, for example 34. When it is desired to reverse the direction of movement of the vehicle by reversing the driven shaft 12, the brake band 90 is made tight to hold the cylindrical body 5 stationary, and the control D is moved inwardly from its intermediate or neutral position, that is to the extreme right hand or reverse position as viewed in Figure 1. When the control D is in its extreme forward position as indicated by the dotted lines in Figure 1, the cylindrical body 5 rotates with the shafts 10 and 12 in the well known manner. However, when a reverse drive is desired, the control D is set as above explained and the brake band 90 tightened by contracting it through any suitable and well known means for that purpose.

The outside of the body or casing 5 is cylindrical so that the same will conveniently cooperate with the said brake band. This brake band may be manipulated in any well-known manner to grip the outside of the cylinder thereby producing a braking effect on the driven shaft 12 in the well-known manner.

Figure 11:
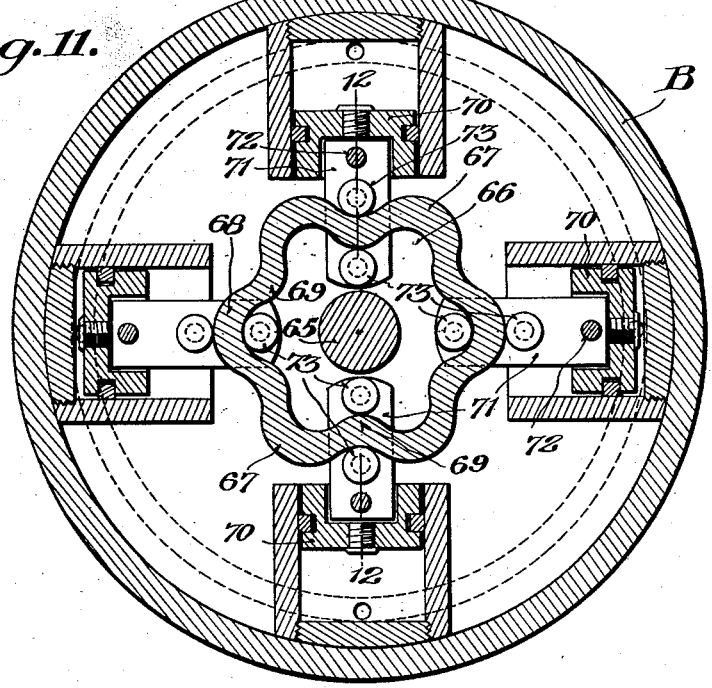
Figure 11 is a transverse sectional view of a modified form of primary pump actuating mechanism.

In Figures 11 and 12 I have illustrated another form of driving means for the pump B. Instead of employing a crank shaft I provide a straight driving shaft 65 having a cam 66 fixed thereon, said cam including a laterally extending peripheral flange 67 of wave-like construction including alternate high points 68 and low points 69. The pistons 70 which are respectively associated with the pump cylinders are each provided with a link 71 having its outer end pivoted as at 72 to the corresponding piston, and provided adjacent its inner end with a pair of spaced cam rollers 73—73 engaging above and below the flange 67 of the cam. Upon rotation of the drive shaft 65 the cam 67 will, of course, cause the pistons to reciprocate through the medium of the high and low points 68 and 69 of the cam alternately engaging with the cam rollers of the respective pistons.

Figure 13:
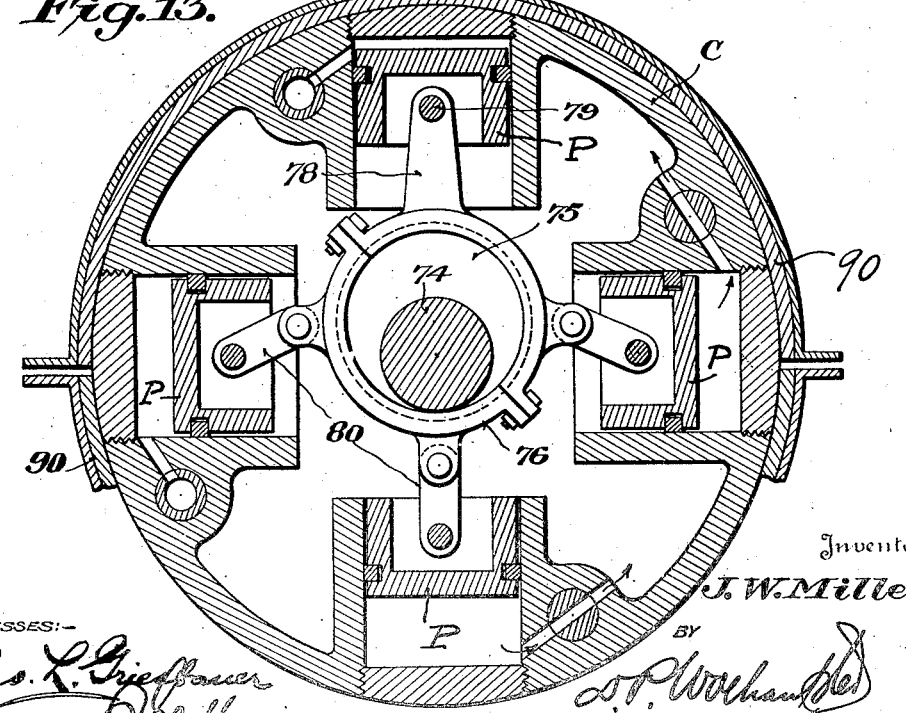
Figure 13 is a transverse sectional view similar to Figure 11 but showing another form of driving connections for the secondary pump.

In Figure 13 I have provided another form of driving connection between the pistons of the motor or driver C and the driven shaft. In this instance I have employed a straight shaft 74, instead of a crank shaft as heretofore described, and fixed on this shaft is an eccentric 75 having a flanged sleeve 76 loosely mounted on its periphery. The sleeve 76 is provided with a radially extending arm 78 which has pivotal connection as at 79 with the pistons P contained in one of the motor cylinders. The pistons of the remaining cylinders are each pivotally connected to the sleeve 76 by a link 80.

From the foregoing, it will be apparent that the present construction includes the casing or body 5 which has the intermediate partition wall or web 15 having therein the fluid chamber 30 which receives the oil from the cylinders of the pumping unit B, which cylinders are carried by the end wall 7, while the opposite end of the body 5 has the motor cylinders formed adjacent the partition 15 to receive the fluid from the reservoir through the motor valves 44. By manipulating the control valves 44 the transmission of power from the engine to the driven or propeller shaft may be regulated according to conditions of load, speed, or idleness as well as forward and reverse driving.

Without further description, it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. A fluid transmission having a casing including a pump chamber, a motor chamber in open communication to permit the return of oil from the motor chamber to the pump chamber, and an oil chamber separating the pump chamber from the motor chamber, a multiple piston-and-cylinder pump arranged in the pump chamber and in communication therewith the cylinders of the pump having check-valve communication with the oil chamber and discharging into the latter, a multiple piston-and-cylinder motor arranged in the motor chamber, and each unit of which motor is provided therein with a combined inlet and exhaust valve, the inlet port of said valve having a constant open communication with the oil chamber and the exhaust port of said valve having communication with the cylinder of the motor unit and with the interior of the motor chamber, and shaft sections respectively connecting with the pump and the motor.

2. A fluid transmission having a casing open at the ends and provided with an intermediate partition provided therein with an oil chamber, closures for the open ends of the casing respectively forming at opposite sides of said partition a pump chamber and a motor chamber, the said two chambers being in open communication for the return of oil from one to the other, a pump arranged in the pump chamber and having valved outlets to the oil chamber, a motor in the motor chamber having valves whose inlets communicate with said oil chamber, valve operating mechanism for the valves of the motor, and shaft sections respectively connecting with the pump and with the motor.

3. A fluid transmission including in combination with a drive shaft and a driven shaft, a casing including a pump chamber and a motor chamber, and an oil distributing chamber arranged between the pump chamber and motor chamber, a pump within the pump chamber and operatively connected with said drive shaft, a motor within the motor chamber, and including a plurality of cylinders cast therewith and pistons therein having driving connections with said driven shaft, said casing having passages for directing oil from the oil distributing chamber into the motor cylinders and outlet passages for directing oil from the pump into the oil distributing chamber, valves for controlling the passage of fluid into and from all of the several motor cylinders in succession, and means for operating said valves comprising an eccentric mounted on the driven shaft, connections between the respective valves and the eccentric, a sleeve having two helical grooves mounted on said driven shaft and fixed to said eccentric, said driven shaft having an elongated transverse opening therein, a cross pin extending through said spiral grooves and opening, and manual means for bodily moving said pin longitudinally of said shaft to oscillate said eccentric.

In testimony whereof I hereunto affix my signature in the presence of two witnesses.

J. W. MILLER.

Witnesses:
EMORY L. GROFF,
V. L. WATSON.